UNITED STATES PATENT OFFICE.

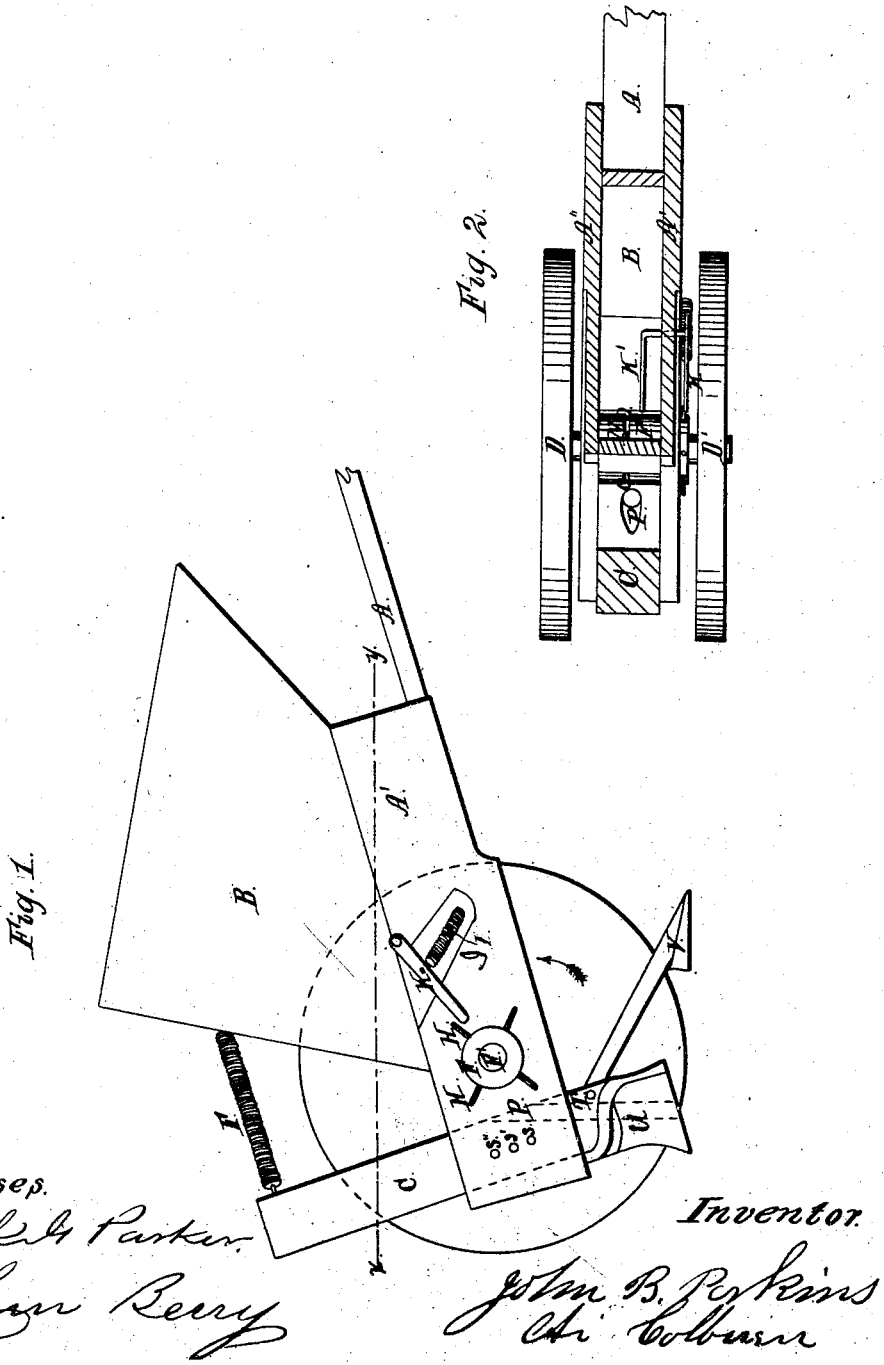

JOHN B. PERKINS AND AI COLBURN, OF HOLLIS, NEW HAMPSHIRE.

IMPROVEMENT IN SEED-SOWING MACHINES.

Specification forming part of Letters Patent No. 78,538, dated June 2, 1868.

*To all whom it may concern:*

Be it known that we, JOHN B. PERKINS and AI COLBURN, of Hollis, in the county of Hillsborough and State of New Hampshire, have invented certain new and useful Improvements in Seed-Sowing Machines; and we do hereby declare the following to be a full and exact description thereof, reference being had to the accompanying drawings, and to the letters of reference marked thereon.

To enable others skilled in the art to make and use our invention, we will proceed to describe its nature, construction, and use.

The nature of our invention consists in a peculiar combination and arrangement of parts, which can only be understood by inspection of the drawings and specification.

In the drawings, Figure 1 is an elevation with one of the wheels removed. Fig. 2 is a horizontal section on the line $xy$, Fig. 1, showing all parts below the section-line in plan.

The construction of our improved sower is as follows:

A is a handle to which side pieces, A' A'', are attached. Through these side pieces the axle F' passes, to which axle the seed-drum F and the wheels D D' are attached.

B is a hopper, the opening in the bottom of which is occupied by the seed-drum F. This seed-drum F has a small channel, O O, Fig. 2, passing around it, and a number of small recesses, one of which, N, is shown in Fig. 2. As these recesses pass the opening at the bottom of the hopper they receive the seeds, and carrying them around drop them into the opening P, Fig. 2, indicated by dotted lines in Fig. 1.

K' is a vibrating arm, which extends to the opening in the bottom of the hopper, and serves to stir the seeds, and thus keep them from packing. This arm is vibrated by the pins H H, Fig. 1, which, being attached to the axle, come in contact with the lever K, to which the vibrating arm K' is attached. The spring I, Fig. 1, snaps the lever K back to place when released by the pins H.

C is a beam vibrating upon a pin, S', Fig. 1. To the lower end of this beam the plow U is attached, which serves to make a furrow into which the seeds passing through the perforations P drop.

Attached to the upper end of the beam C is a spring, E, which allows the plow to yield to and pass over any obstructions which it may meet. The beam C may be raised or lowered by changing the pin S' to S or S''.

V is a coverer pivoted to the beam C by the pin or pivot T. If desirable, a number of these devices for making the furrow, dropping the seed, and covering may be attached to a single shaft and pair of wheels, so that a number of rows of seeds may be planted at the same time.

What we claim as our invention is—

1. The vibrating plow-beam C, held by the spring E, in combination with the coverer V, arranged substantially as described, and for the purpose set forth.

2. The agitator K', arranged and operated substantially as described and for the purpose set forth.

JOHN B. PERKINS.
AI COLBURN.

Witnesses:
FRANK G. PARKER,
A. HUN BERRY.